(12) United States Patent
Tracht et al.

(10) Patent No.: US 6,443,536 B1
(45) Date of Patent: Sep. 3, 2002

(54) BRAKE PRESSURE MODULATOR WITH PRESSURE SENSOR MANIFOLD

(75) Inventors: Steven Lee Tracht, Springboro, OH (US); Jerry Lee Newton, Richmond, IN (US); George A. Spaeth, Mason, OH (US); Demetris Andreou Agrotis, El Paso, TX (US); Michelle Kay Goecke, Dayton; Elaine Ann Ruble, Bellbrook, both of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/775,300

(22) Filed: Feb. 1, 2001

(51) Int. Cl.$^7$ .................................................. B60T 8/36
(52) U.S. Cl. ............................... 303/119.3; 303/116.4; 303/DIG. 10; 303/DIG. 4
(58) Field of Search ........................... 303/119.3, 116.4, 303/DIG. 10, DIG. 3, DIG. 4, 10, 11

(56) References Cited

U.S. PATENT DOCUMENTS

| | | | |
|---|---|---|---|
| 4,399,836 A | | 8/1983 | de Versterre et al. |
| 4,962,972 A | * | 10/1990 | Pizzo ....................... 303/116.4 |
| 5,820,228 A | * | 10/1998 | Schneider et al. ........ 303/119.3 |
| 6,007,162 A | * | 12/1999 | Hinz et al. ............... 303/119.3 |
| 6,126,244 A | | 10/2000 | Fries |

FOREIGN PATENT DOCUMENTS

| | | |
|---|---|---|
| DE | 19917941 | 10/2000 |
| EP | 0157944 | 10/1985 |
| WO | 9950115 | 10/1999 |
| WO | 0017025 | 3/2000 |

* cited by examiner

Primary Examiner—Matthew C Graham
(74) Attorney, Agent, or Firm—Scott A. McBain

(57) ABSTRACT

Master cylinder pressure of either or both of the primary and secondary braking circuits is sensed by a pressure sensor or sensors mounted in a manifold which is installed directly on a brake pressure modulator housing when the modulator is manufactured. The pressure sensors receive power and are grounded through the electronic control unit which is an integral component of the modulator; accordingly, the sensors do not require external electrical connections other than those already provided on the modulator. Since the sensing manifold is installed and tested for leaks when the modulator is manufactured and before the modulator is shipped to the vehicle assembly plant, assembly operations in addition to those required in installation of the modulator in the vehicle braking system are not required.

13 Claims, 2 Drawing Sheets

BRAKE PRESSURE MODULATOR WITH PRESSURE SENSOR MANIFOLD

TECHNICAL FIELD

This invention relates to a brake pressure modulator having a pressure sensing manifold for sensing master cylinder braking pressure.

BACKGROUND OF THE INVENTION

Modern passenger cars and light trucks are equipped with split circuit hydraulic brakes in which the vehicle operator generates braking pressure in primary and secondary braking circuits by operating a brake pedal connected to a master cylinder (usually through a booster that amplifies the force applied by the vehicle operator). More recently, vehicles have commonly been equipped antilock braking systems (ABS), traction control systems (TCS), and vehicle stability control (VSC). Adaptive cruise control (ACC) and panic brake assist (PBA) systems have also been proposed. All of these systems require a brake pressure modulator connected in the primary and secondary braking circuits to control braking pressure communicated to the vehicle brakes. The modulator is equipped with an electronic control unit (ECU), which generates electronic control signals controlling the braking pressure. Commonly, actual master cylinder braking pressure in the primary and secondary master cylinder braking circuits is not sensed. However, it is desirable that the actual braking pressure being developed at the master cylinder be sensed and used by the ECU to control braking pressure.

However, direct sensing of braking pressures has associated cost and reliability considerations. For example, such sensors require separate fluid connections in the braking system, thus creating potential leakage points; require extra assembly operations when the vehicle is manufactured, since the pressure sensor must be installed separately; and require an additional external power connection as well as connections transmitting the signal or signals representing braking pressure. It has also been proposed that pressure sensors be mounted directly on or in the master cylinder itself, but such sensing would still require additional external electrical connections.

SUMMARY OF THE INVENTION

According to the present invention, a pressure sensor or sensors are mounted in a manifold which is installed directly on the modulator housing when the modulator is manufactured. The pressure sensors receive power and are grounded through the electronic control unit which is an integral component of the modulator; accordingly, the sensors do not require external electrical connections other than those already provided on the modulator. Since the sensing manifold is installed and tested for leaks when the modulator is manufactured and before the modulator is shipped to the vehicle assembly plant, assembly operations in addition to those required in installation of the modulator in the vehicle braking system are not required.

DESCRIPTION OF THE PREFERRED EMBODIMENT

Figure 1:
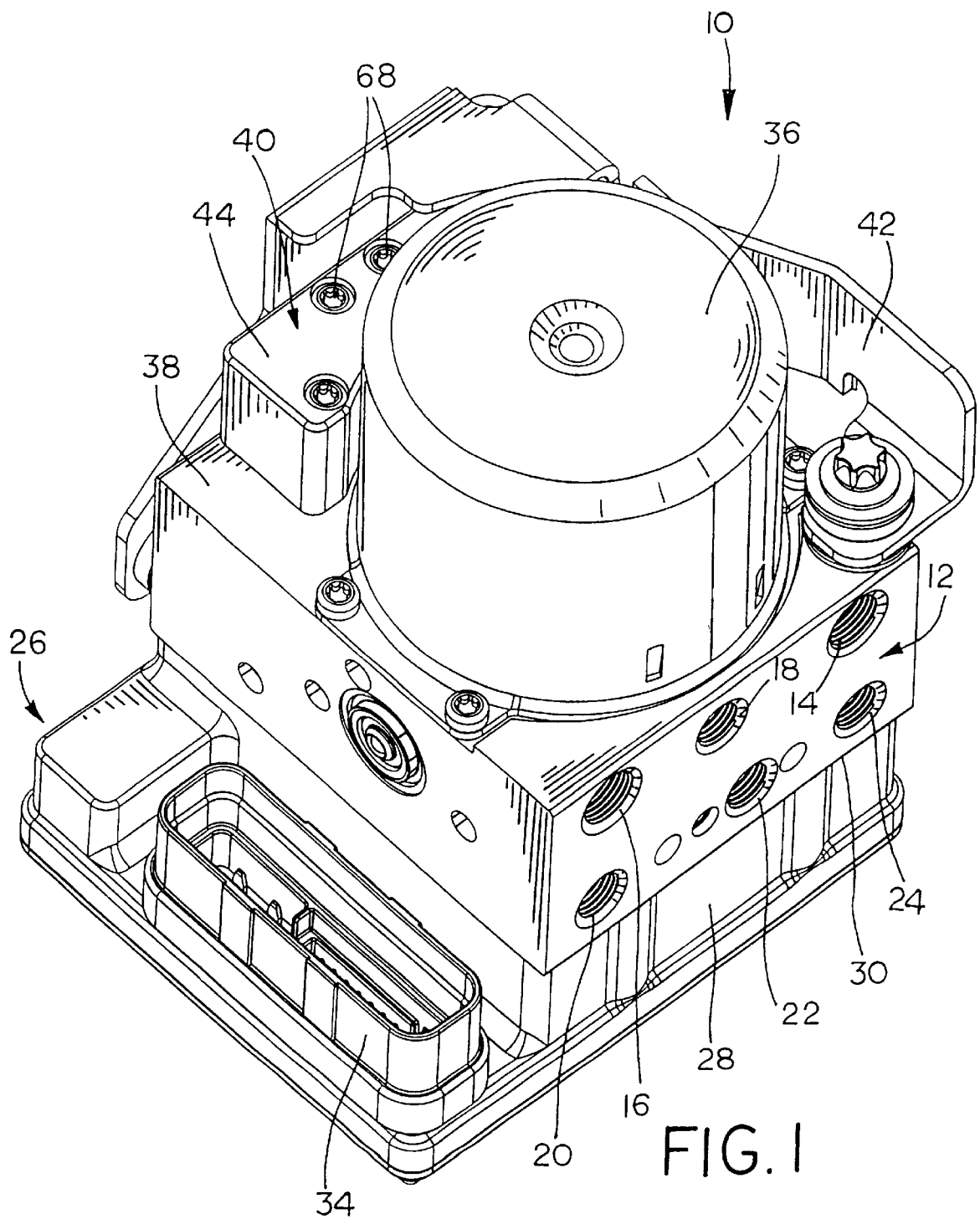
FIG. 1 is a view in perspective of a brake pressure modulator with a pressure sensing manifold made pursuant to the teachings of the present invention.

Referring now to the drawings, a brake pressure modulator assembly generally indicated by the numeral 10 includes a modulator housing generally indicated by the numeral 12 having a pair of inlet ports 14, 16 connected to the primary and secondary master cylinder braking circuits when the modulator assembly 10 is installed on an automotive vehicle and four outlet ports 18, 20, 22 and 24. Each of the outlet ports 18–24 is connected to a corresponding one of the vehicle brakes when the modulator assembly 10 is installed on the vehicle for communication of braking pressure to the brakes when a brake application is effected, in a manner well known to those skilled in the art. An electronic control unit generally indicated by the numeral 26 includes a housing 28 mounted on surface 30 of modulator housing 12. Within the housing 28 is mounted circuit mounting structure such as a circuit board 32 (FIG. 2), which mounts conventional electronic components, such as one or more microprocessors, which generate control signals in response to wheel speed signals generated by wheel speed sensors (not shown). The wheel speed signals vary in accordance with the wheel speed of the corresponding vehicle wheel. The wheel speed signals are transmitted to the electronic control unit 26 through a socket 34 mounted on the housing 28, which receives a plug (not shown) connected to wiring connected to the aforementioned speed sensors at each of the vehicle wheels. The plug and socket 34 also transmit electrical power to electrical control unit 26, and also include a conductor providing grounding.

Within the modulator housing 12 are multiple solenoid valves, a pump, and other fluid control components that respond to the electrical signals generated by the electronic control unit 26 in response to incipient skidding conditions of the vehicle wheels. The electronic control unit 26, and the various solenoid valve, pump, and other components within the housing 12 are conventional and will not be described in detail herein. The pump mounted within the housing 12 is powered by an electric motor (not shown), which is housed within electric motor housing 36 mounted on surface 38 of the modulator housing 12, which is opposite the surface 30. Signals generated by the electronic control unit 26 are transmitted to the corresponding electrically responsive components, such as solenoid valves, through internal electrical circuitry. Power to operate the pump within the pump housing is common with the power supplied through the socket 34 to power the electronic control unit 26.

Also mounted on the upper surface 38 of the modulator housing 12 is a pressure sensing manifold generally indicated by the numeral 40. It will be noted that the pressure sensing manifold 40 extends around a segment of the motor housing 36 and is wholly within the volume defined between the motor housing 36 and an existing mounting bracket 42. Accordingly, addition of the pressure sensing manifold 40 does not change the overall package size of the modulator 10, so that packaging and installation of the modulator 10 on a vehicle is not affected. The manifold 40 includes a housing 44 which extends over apertures 46,48 in the surface 38. Each of the apertures 46,48 terminates a corresponding one of fluid passages 50,52 within the modulator housing 12, which communicate with a corresponding one of the inlet ports 14, 16. Each of these passages 50,52 accordingly communicate the pressure levels in the primary and secondary master cylinder circuits at all times. These passages are also communicated to the solenoid valves and other fluid control components within the modulator housing 12, but, as discussed above, these passages 50 and 52 are isolated from the brake pressure build and decay cycles during antilock operation of the modulator 10 and hence the pressure level at the apertures 46,48 is representative of master cylinder pressure at all times.

Mounted within the housing 44 is a circuit board, flex circuit, or equivalent structure generally indicated by the numeral 54. Mounted on the circuit board 54 are a pair of coin-shaped pressure sensors 56,58. The spacing between the pressure sensors 56,58 is such that the pressure sensors will register with the apertures 46,48 when the manifold 40 is installed on the housing 12. The pressure sensors 56,58 may be of the piezo-resistive, strain gauge, ceramic capacitive, or any other pressure sensor well known to those skilled in the art. The pressure sensors 56,58 generate an electrical signal which varies in accordance with the pressure sensed. Power and grounding are provided to the pressure sensor 56,58, through the circuit board 54, and the signal generated by the pressure sensors 56,58 is also transmitted through the conductors within the circuit board.

Figure 2:
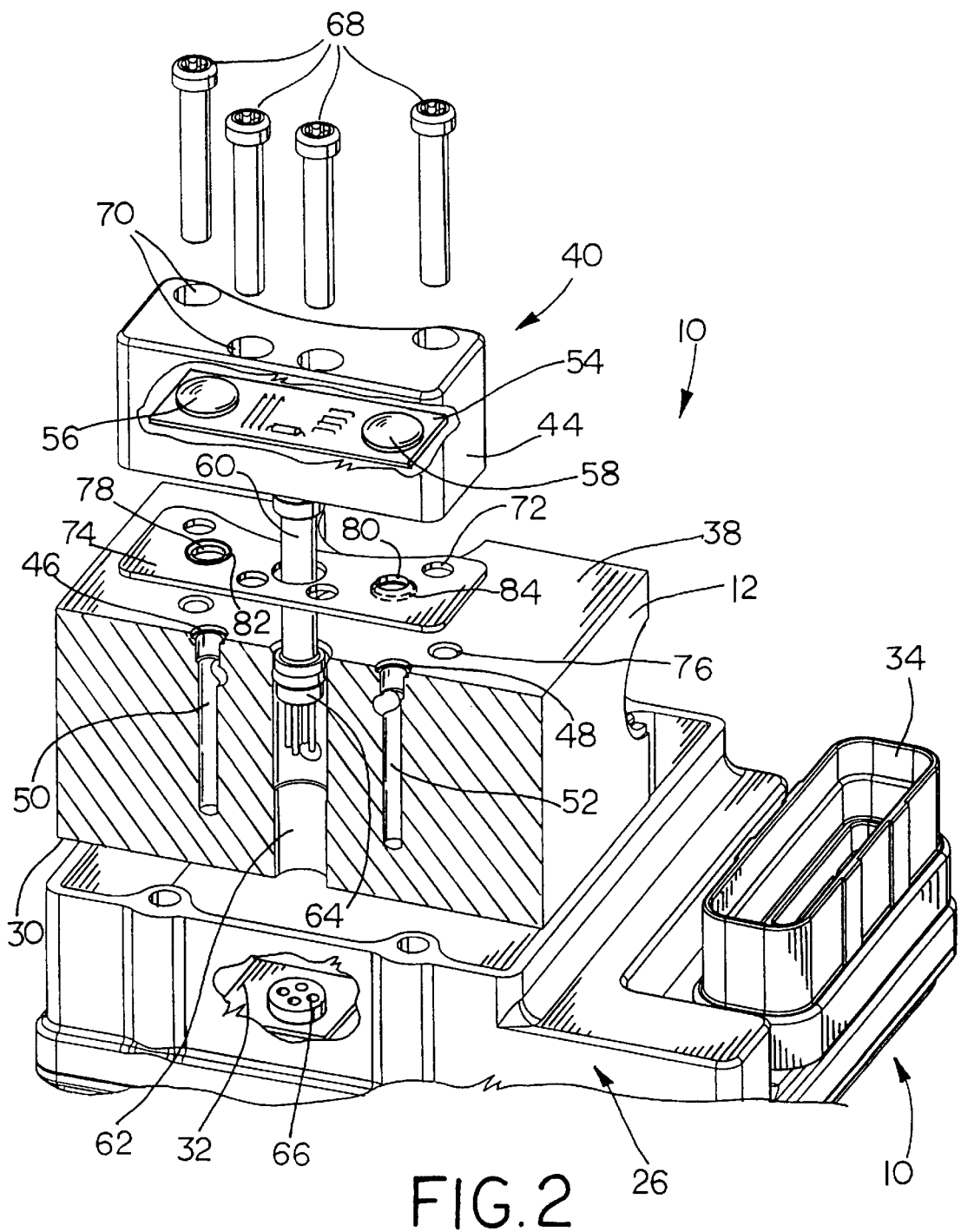
FIG. 2 is an exploded view in perspective of the modulator shown in FIG. 1, with portions shown in cross section or cut away to show internal components.

An electrical connecting member generally indicated by the numeral 60 is mounted on the circuit board 54 and extends downwardly therefrom, viewing FIG. 2. The electrical connecting member 60 contains at least four conductors, two of which provide conditioned power and grounding to the circuit board 54 (and, therefore, to the pressure sensors 56,58), and two of which transmit the signals representing pressure sensed by the pressure sensors 56,58. The connecting member 60 extends through bore 62 in modulator housing 12, which extends all of the way through the modulator housing 12 between the surfaces 38 and 30. The length of the connecting member 60 is such that it extends all of the way through the modulator housing 12 with the end of the member 60 opposite the end connected to circuit board 54 being received within the housing 28 of electrical control unit 26. The member 60 terminates in a plug 64 which plugs into a socket 66 provided on circuit board 32 mounted within the housing 28 of electrical control unit 26. Accordingly, power and grounding are supplied to the sensors 56 and 58 through the electronic control unit 26, and the signals representing master cylinder pressure sensed by the sensors 56,58 are transmitted back to the electronic control unit 26, which processes the signals along with the signals representing wheel speed to control the electrically responsive components within the modulator housing 12.

Fasteners 68 secure the manifold 40 to the surface 38 of the modulator housing 12. The fasteners 68 each extend through corresponding apertures 70 in the housing 44, through corresponding apertures 72 in a plate 74, which is clamped between the housing 44 and the surface 38 when the manifold 40 is installed on the modulator housing 12, and into corresponding bores 76 in the modulator housing 12 to secure the manifold 44 to the modulator housing 12. The plate 74 further includes a pair of apertures 78,80 which are spaced to register with the apertures 46,48 and with the pressure sensors 56,58 when the manifold 40 is installed on the modulator housing 12. Each of the apertures 78,80 are provided with a pair of circumferentially extending seals 82,84 which seal against the surface 38 and the pressure sensors 56,58 to provide a fluid tight connection between the manifold and the modulator housing 12.

It will be noted that in some applications of the modulator 10 the pressure sensing capabilities of the present invention are not necessary. In that event, the manifold 40 is omitted, and the apertures 46,48 and bore 62 are plugged. Accordingly, modulators both with and without pressure sensing abilities can be manufactured using the same tooling and equipment. Furthermore, power and grounding is provided to the manifold 40 through the electronic control unit 26 and the pressure signals are also processed by the electronic control unit 26; accordingly, a separate electrical connection for the pressure sensor is not required. The manifold is installed and tested for leaks when the modulator 10 is manufactured; accordingly, separate assembly operations involving fluid connections are not required at the vehicle assembly plant.

Although the invention has been described with regard to sensing pressures in both the primary and secondary master cylinder pressure circuits, it will be noted that in many cases it is acceptable to sense only a single pressure (usually, the pressure in the primary circuit). In this case, only one of the pressure sensors 56,58 is provided, and the corresponding one of the apertures 46 or 48 is either omitted or plugged.

What is claimed is:

1. Brake pressure modulator with pressure sensing assembly comprising an electronic control unit for generating electrical control signals for controlling braking pressure, a pressure modulating housing having an inlet port connected to the pressure generated by a vehicle master cylinder and at least one outlet port connected to a corresponding one of the vehicle brakes, said modulating housing including electrically responsive means responsive to said control signals for modulating the brake pressure at said outlet port, a pressure sensing assembly mounted on said modulating housing, said pressure sensing assembly including at least one pressure sensor for sensing the pressure level at said inlet port and an electrical connecting member connecting said pressure sensor to said electrical control unit, said modulating housing includes a passage defined by said housing communicating said one inlet port to said pressure sensor, said electrical connecting member extends through said modulator housing and engages said electronic control unit, said pressure sensing assembly is secured to one side of said modulator housing and said electronic control unit is secured on another side of said modulator housing, said electrical connecting member extending through said modulating housing between the sides thereof for providing an electrical connection between said pressure sensor and said electronic control unit.

2. Brake pressure modulator as claimed in claim 1, wherein said electronic control unit is connected to an electrical ground and includes an external socket for connecting said electronic control unit to an electrical power supply, said electrically connecting member including a first conductor for transmitting power from said electrical control unit to said sensor and a second conductor for grounding said sensor through said electronic control unit.

3. Brake pressure modulator as claimed in claim 2, wherein said pressure sensing assembly includes a sealing member providing a sealing interface between the passage and said pressure sensor.

4. Brake pressure modulator as claimed in claim 2, wherein said pressure sensor is mounted on an electrical support structure, one end of said electrically connecting member being mounted on said electrical support structure, said electrical support structure including electrical circuitry connecting said pressure sensor to said electrically connecting member.

5. Brake pressure modulator as claimed in claim 4, wherein the other end of said electrically connecting member terminates in an electrical connector which plugs into a corresponding electrical connector on said electronic control unit.

6. Brake pressure modulator as claimed in claim 4, wherein said electrical connecting member and said electrical support structure include a conductor connecting said sensor with said electrical control unit.

7. Brake pressure modulator as claimed in claim 4, wherein said passage terminates at said one side of said modulator housing, said pressure sensing assembly including a sealing member engaging said one side of said modulator housing to provide a sealed connection between said one side and said pressure sensor.

8. Brake pressure modulator as claimed in claim 1, wherein said pressure sensor is mounted on an electrical support structure mounted within said pressure sensing assembly, one end of said electrically connecting member being mounted on said electrical support structure, said electrical support structure including electrical circuitry connecting said pressure sensor to said electrically connecting member.

9. Brake pressure modulator as claimed in claim 8, wherein said passage terminates at one side of said modulator housing, said pressure sensing assembly including a sealing member engaging said one side of said modulator housing to provide a sealed connection between said one side and said pressure sensor.

10. Brake pressure modulator with pressure sensing assembly comprising an electronic control unit for generating electrical control signals controlling braking pressure, a pressure modulating housing having a pair of inlet ports connected to primary and secondary master cylinder pressure circuits and multiple outlet ports connected to corresponding vehicle brakes, said modulating housing including electrically responsive means responsive to said electrical control signals for modulating the brake pressure at said outlet ports, a pressure sensing assembly mounted on said modulating housing, said pressure sensing assembly including a pair of pressure sensors for sensing the pressure level at a corresponding one of said inlet ports, an electrical connecting member connecting said pressure sensors to said electrical control unit, said modulating housing includes a pair of passages defined within said housing communicating a corresponding one of said inlet ports to a corresponding pressure sensor, said pressure sensors are mounted on an electrical support structure, one end of said electrically connecting member being mounted on said electrical support structure, said electrical support structure including electrical circuitry connecting said pressure sensor to said electrically connecting member.

11. Brake pressure modulator as claimed in claim 10, wherein said electrical connecting member and said electrical support structure include conductors connecting each of said sensors with said electrical control unit.

12. Brake pressure modulator as claimed in claim 10, wherein said passages terminate at one side of said modulator housing, said pressure sensing assembly including a sealing member engaging said one side of said modulator housing to provide a sealed connection between said one side and said pressure sensors.

13. Brake pressure modulator with pressure sensing assembly comprising an electronic control unit for generating electrical control signals for controlling braking pressure, a pressure modulating housing having an inlet port connected to the pressure generated by a vehicle master cylinder and at least one outlet port connected to a corresponding one of the vehicle brakes, said modulating housing including electrically responsive means responsive to said control signals for modulating the brake pressure at said outlet port, a pressure sensing assembly mounted on said modulating housing, said pressure sensing assembly including at least one pressure sensor for sensing the pressure level at said inlet port and an electrical connecting member connecting said pressure sensor to said electrical control unit, said pressure sensing assembly is secured to one side of said modulator housing and said electronic control unit is secured on another side of said modulator housing, said electrical connecting member extending through said modulating housing between the sides thereof for providing an electrical connection between said pressure sensor and said electronic control unit.

\* \* \* \* \*